(12) United States Patent (10) Patent No.: US 8,412,937 B2
Maubach et al. (45) Date of Patent: Apr. 2, 2013

(54) METHOD AND SYSTEM FOR AUTHENTICATION OF A LOW-RESOURCE PROVER

(75) Inventors: Stefan Jean Maubach, Nijmegen (NL); Claudine Viegas Conrado, Eindhoven (NL); Geert Jan Schrijen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1326 days.

(21) Appl. No.: 12/097,404

(22) PCT Filed: Nov. 27, 2006

(86) PCT No.: PCT/IB2006/054453
§ 371 (c)(1),
(2), (4) Date: Jun. 13, 2008

(87) PCT Pub. No.: WO2007/069108
PCT Pub. Date: Jun. 21, 2007

(65) Prior Publication Data
US 2008/0271115 A1 Oct. 30, 2008

(30) Foreign Application Priority Data
Dec. 14, 2005 (EP) .................................... 05112122

(51) Int. Cl.
*G04L 9/32* (2006.01)
(52) U.S. Cl. .............. 713/168; 713/169; 713/170; 726/2
(58) Field of Classification Search ...... 726/2; 713/168, 713/169, 170
See application file for complete search history.

(56) References Cited

U.S. PATENT DOCUMENTS
5,202,921 A 4/1993 Herzberg et al.
(Continued)

FOREIGN PATENT DOCUMENTS
EP 0511483 A2 11/1992
(Continued)

OTHER PUBLICATIONS

Blom R: "Non-Public Key Distribution"; Advances in Cryptology, Santa Barbara, California, Aug. 23-25, 1982, Proceedings of Crypto, A Workshop on the Theory and Application of Cryptographic Techniques, New York, NY, Plenum Press, US, Aug. 23, 1982, pp. 231-236.

(Continued)

*Primary Examiner* — Krisna Lim
(74) *Attorney, Agent, or Firm* — Larry Liberchuk

(57) ABSTRACT

A method is presented for enabling authentication of a prover in a Radio Frequency Identification system comprising the prover and a verifier, the method comprising the steps of: the prover sending a prover identifier and a parent identifier to the verifier, the verifier sending a verifier identifier to the prover, the prover calculating a first common secret by means of a prover polynomial, where an unknown in the prover polynomial is substituted by a result calculated using a function of at least the verifier identifier, and the verifier calculating the first common secret by means of a first verifier polynomial, wherein a first unknown in the first verifier polynomial is substituted by the prover identifier and a second unknown in the first verifier polynomial is substituted by the parent identifier, the prover creating a first message by modulating a first core secret with regard to at least the first common secret, aid prover sending the first message to the verifier, and the verifier creating a first candidate for the first core secret by demodulating the first message with the first common secret, whereby the candidate for the first core secret is for use in the authentication. This allows the verifier and prover to independently create a common secret, used for modulating the core secret. Furthermore, no pre-registration of the prover with the verifier is required and calculation using polynomials requires little processing power. A corresponding system, prover and verifier are also presented.

17 Claims, 3 Drawing Sheets

U.S. PATENT DOCUMENTS

| | | | | |
|---|---|---|---|---|
| 5,966,445 | A | * | 10/1999 | Park et al. .................... 713/180 |
| 6,076,163 | A | | 6/2000 | Hoffstein et al. |
| 7,245,718 | B2 | * | 7/2007 | Sundaram et al. ............. 380/30 |
| 7,333,001 | B2 | * | 2/2008 | Lane et al. .................. 340/10.1 |
| 7,363,492 | B2 | * | 4/2008 | Kuhlman et al. ............. 713/166 |
| 7,913,088 | B2 | * | 3/2011 | Hoffstein et al. ............. 713/180 |
| 8,232,862 | B2 | * | 7/2012 | Lowe ........................... 340/5.53 |
| 2006/0195692 | A1 | * | 8/2006 | Kuhlman et al. ............. 713/166 |
| 2008/0271115 | A1 | * | 10/2008 | Maubach et al. ................. 726/2 |

FOREIGN PATENT DOCUMENTS

| | | | |
|---|---|---|---|
| WO | WO03077470 | A1 | 9/2003 |
| WO | WO2006035400 | A1 | 4/2006 |
| WO | WO2007069108 | * | 6/2007 |

OTHER PUBLICATIONS

Juels A: "A Minimalist Cryptography for Low-Cost RFID Tags"; Security of Communications Networks (SCN); C. Blundo Editors, [Online] 2004, 29 Page Document, Retrieved From the Internet: URL:http://www.rsa.com/rsalabs/staff/bios/ajuels/publications/minimalist/Minimalist/pdf.

Weis et al: "Security and Privacy Aspects of Low-Cost Radio Frequency Identification Systems"; Laboratory for Computer Science, Auto-ID Center, Massachusetts Institute of Technology, First International Conference on Security in Pervasive Computing, 2003, 12 Page Document.

* cited by examiner

METHOD AND SYSTEM FOR AUTHENTICATION OF A LOW-RESOURCE PROVER

The present invention relates to security in digital systems and in particular authenticating a prover in a digital system.

The use of Radio Frequency Identification (RFID) tags for consumer product management is likely to increase efficiency while decreasing the costs of product management, from the product's manufacturing to the point of sale to the consumer (when the tags will replace the bar codes used nowadays). A universal standard has been already defined, EPC Global, 2003a, Version 1.0 Specifications for RFID Tags, referred to as Electronic Product Code (EPC) Global. This initiative is supposed to cover basically all consumer products. Therefore, to be economically feasible to have RFID tags in cheaper products, these tags must be also low-cost, implying that they are limited in their processing power, storage and communication capabilities.

Low-cost, powerless RFID tags work by basically answering with a unique identifier (the EPC) per tag when queried by an RFID reader from which the tags get the power. This unique identifier in each and every consumer product item can be used by, e.g. a retailer's reader, to identify a product and further to point to a full product record in a database that can be accessed by the retailer. In general, these applications will involve very large numbers of tagged products which can come into the domain of a reader. In this case, to keep the system flexible and practical, a reader may be required to identify any of these products/tags without having their identifiers pre-registered with the reader.

For consumers, there are also numerous possible applications of unique product identification (e.g., smart ovens automatically setting the cooking instructions of food items) so it is interesting to keep the tag's functionality after sale to the consumer. However, the ubiquitous aspect of these tags, together with their straightforward answering behavior (shouting their EPC to any reader's request), brings also privacy concerns to the consumer. An unauthorized person carrying a reader may be able to learn the identifiers of the products carried by a person on the move, thus learning what the person carries or wears. Moreover, a person's tracking may be possible by the unique combination of tags they carry often with them.

Attempts to solve these concerns of privacy have been put forth. In a paper by Ari Juels entitled "Minimalist Cryptography for Low-Cost RFID Tags", which was either available at the time of filing this patent application on the URL associated with RSA Laboratories or available in the book entitled Security of Communication Networks (SCN) edited by Blundo at pages 149-164 (2004), an attempt to solve these problems is put forth. The paper proposes a security scheme for the private authentication of a tag with a reader which shifts the burden on the tag from computation to memory requirements. In this scheme, a tag has multiple pseudonyms through which it rotates when queried by readers. To accomplish mutual authentication between tag and reader, they share a priori the list of all the tag's pseudonyms and, for each pseudonym, two further secret values which are exchanged by both parties to achieve mutual authentication. Since all values are transmitted in clear text, a mechanism is described for the reader to renew all values (i.e., pseudonyms and secret values) in the tag after mutual authentication. While this scheme provides tag authentication (and not only identification), which prevents tag cloning, it has drawbacks. One drawback of considerable weight is the fact that pre-registration of tags with readers is necessary. Moreover, the interaction of a tag with more than one reader is not addressed, so once a reader updates a tag there is no proposed mechanism for other readers to learn the new updated tag values. Furthermore, the scheme is very demanding on tag-reader communication costs.

In view of the above, an objective of the invention is to address the problems discussed above, and in particular to provide a private authentication of low-power tags by readers, in which any tag may be privately authenticated by one or more readers, without requiring pre-registration.

Generally, the above objective is achieved by the attached independent claims.

A first aspect of the invention is a method for enabling authentication of a prover in a Radio Frequency Identification system comprising the prover and a verifier, the method comprising the steps of: the prover sending a prover identifier and a parent identifier to the verifier, the verifier sending a verifier identifier to the prover, the prover calculating a first common secret by means of a prover polynomial, where an unknown in the prover polynomial is substituted by a result calculated using a function of at least the verifier identifier, and the verifier calculating the first common secret by means of a first verifier polynomial, wherein a first unknown in the first verifier polynomial is substituted by the prover identifier and a second unknown in the first verifier polynomial is substituted by the parent identifier, the prover creating a first message by modulating a first core secret with regard to at least the first common secret, aid prover sending the first message to the verifier, and the verifier creating a first candidate for the first core secret by demodulating the first message with the first common secret, whereby the candidate for the first core secret is for use in the authentication. This allows the verifier and prover to independently create a common secret, used for modulating the core secret. This common secret makes pre-registration of the prover with the verifier unnecessary. Furthermore, calculation using polynomials requires little processing power.

The step of the prover calculating a first common secret, may involve calculating the first common secret by means of the prover polynomial, wherein an unknown in the prover polynomial is substituted by a result calculated using a function of at least the verifier identifier and a first value of a parameter, the step of the verifier calculating the first common secret may involve calculating the first common secret by means of a first verifier polynomial, wherein a first unknown in the second verifier polynomial is substituted by the prover identifier and a second unknown in the second verifier polynomial is substituted by the parent identifier, wherein the first verifier polynomial being associated with the first value of the parameter, and the method may comprise the further steps of: the prover calculating a second common secret by means of the prover polynomial, wherein an unknown in the prover polynomial is substituted by a result calculated using a function of at least the verifier identifier and a second value of a parameter, and the verifier calculating a second common secret by means of a second verifier polynomial, wherein a first unknown in the second verifier polynomial is substituted by the prover identifier and a second unknown in the second verifier polynomial is substituted by the parent identifier, wherein the second verifier polynomial is associated with the second value of the parameter.

The function of at least the verifier identifier and a value of a parameter may be a sum of the verifier identifier and the value of the parameter. Using a summation as the function is adequate in this situation and requires little processing power.

The prover polynomial may derived from a master polynomial, where a first unknown has been substituted by the prover identifier, and a second unknown has been substituted with a parent identifier, and the verifier polynomials are derived from the master polynomial, where a third unknown has been substituted by a sum of the verifier identifier and the first value of the parameter, the first verifier polynomial being associated with a second value of the parameter, the master polynomial comprises at least three unknowns. The master polynomial may thereby be kept secret and generate required verifier and prover polynomials.

The second core secret may be set to be the prover identifier for a subsequent execution of the method.

The master polynomial may be derived from a network master polynomial, the network master polynomial having at least four unknowns. Thereby a hierarchy of polynomials can be created, simplifying deployment.

The method may comprise the further steps of: the prover creating a second message by modulating the first core secret with the second common secret, the prover sending the second message to the verifier, the verifier creating a second candidate for the first core secret by demodulating the second message with the second common secret, the verifier conditionally authenticating the first core secret being the first candidate of the first core secret, the verifier condition comprising at least that a value of the first candidate for the first core secret equals a value of the second candidate for the first core secret. This allows an authentication of the first core secret.

The method may comprise the further steps of: the verifier creating a second core secret, the verifier creating a third message by modulating the second core secret with a common secret, the verifier creating a calculating secret, the verifier creating a fourth message by modulating the calculating secret with a common secret, the verifier creating a fifth message by modulating the second core secret and the calculating secret with a common secret, the verifier sending the third, the fourth and the fifth messages to the prover, the prover creating a candidate second core secret by demodulating the third modulated message with a common secret corresponding to the common secret with which the third message was modulated, the prover creating a candidate calculating secret by demodulating the fourth modulated message with a common secret corresponding to the common secret with which the fourth message was modulated, the prover creating an authentication item by demodulating the fifth modulated message with a common secret corresponding to the common secret with which the fifth message was modulated, the prover conditionally authenticating the second core secret as the candidate second core secret and the calculating secret as the candidate calculating secret, the conditional prover condition comprising at least that the authentication item equals the fifth modulated secret. The update of certain secrets by the verifier increases security for the next authentication.

The calculating secret may comprise new coefficients for the prover polynomial, to be used by the prover when calculating subsequent common secrets.

The step of the verifier creating a calculating secret may involve creating coefficients for the prover polynomial by substituting an unknown in the first verifier polynomial with the second core secret.

The second core secret may be set to be the prover identifier for a subsequent execution of the method.

The method may comprise the further steps, prior to the step of the prover sending a prover identifier, of: the verifier choosing a first parameter and a second parameter, the verifier sending the first parameter and the second parameter to the prover, wherein the step of the prover calculating the first common secret involves using the first parameter, the step of the prover calculating a second common secret involves using the second parameter, the first verifier polynomial is associated with the first parameter, and the second verifier polynomial is associated with the second parameter. This provides security against replay attacks.

The method may comprise the further steps, before the step of the verifier creating a fourth message, of: the prover and the verifier establishing a third common secret and a fourth common secret, and wherein in the step of the verifier creating a third message, the common secret is the third common secret, in the step of: the verifier creating a fourth message, the common secret is the third common secret, in the step of: the verifier creating a fifth message, the common secret is the fourth common secret, in the step of: the prover creating a candidate second core secret, the common secret is the third common secret, in the step of: the prover creating a candidate calculating secret, the common secret is the third common secret, in the step of: the prover creating an authentication item, the common secret is the fourth common secret.

The third common secret may be associated with a third value of the parameter and the fourth secret is associated with a fourth value of the parameter.

The step of the verifier creating a second core secret, may involve setting the second core secret to a random number.

The first core secret is an Electronic Product Code.

Each operation of modulating may involve performing an exclusive OR operation, and each operation of demodulating may involve performing an exclusive OR operation.

A second aspect of the invention is a radio frequency identification system for enabling authentication of a prover, the system comprising the prover and a verifier, the prover, the prover comprising means for sending a prover identifier and a parent identifier to the verifier, the verifier comprising means for sending a verifier identifier to the prover, the prover comprising means for calculating a first common secret by means of a prover polynomial, where an unknown in the prover polynomial is substituted by a result calculated using a function of at least the verifier identifier, and the verifier comprising means for calculating the first common secret by means of a first verifier polynomial, wherein a first unknown in the first verifier polynomial is substituted by the prover identifier and a second unknown in the first verifier polynomial is substituted by the parent identifier, the prover comprising means for creating a first message by modulating a first core secret with regard to at least the first common secret, the prover comprising means for sending the first message to the verifier, and the verifier comprising means for creating a first candidate for the first core secret by demodulating the first message with the first common secret.

A third aspect of the invention is a Radio Frequency Identification prover configured to form part of a system according to the second aspect.

A fourth aspect of the invention is a Radio Frequency Identification verifier configured to form part of a system according to the second aspect.

It is to be noted that in an RFID system, a prover typically corresponds to a tag and a verifier typically corresponds to a reader.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

Embodiments of the present invention will now be described in more detail, reference being made to the enclosed drawings, in which.

It is to be noted that although the described embodiments below are related to RFID, the invention is not limited to RFID systems.

Figure 1:
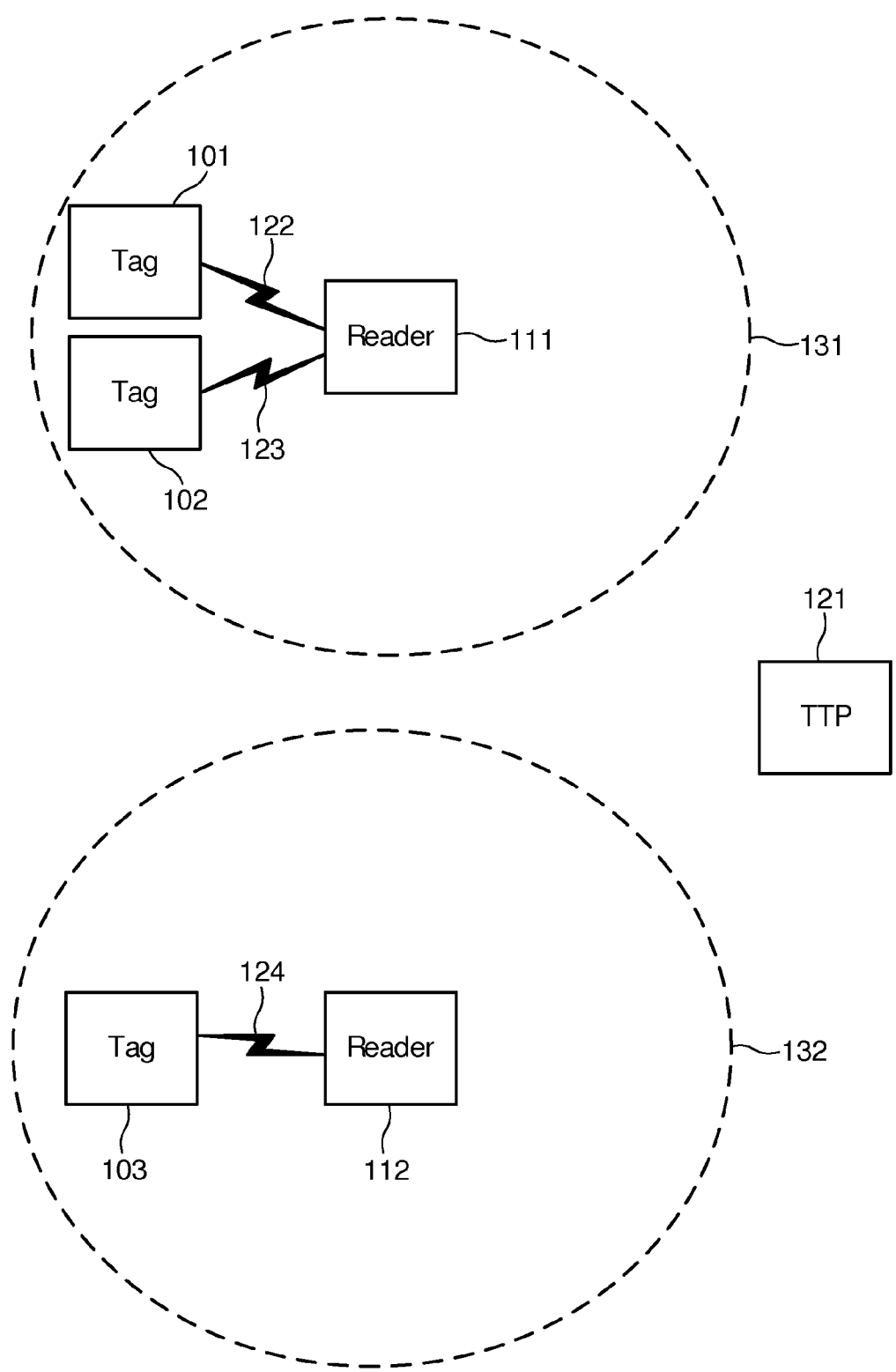
FIG. 1 shows an environment in which an embodiment of the present invention may be applied.

FIG. 1 shows an environment in which an embodiment of the present invention may be applied. A first reader 111 has a limited range 131 within which it can communicate with tags. Currently there is a first tag 101 and a second tag 102 which can communicate over wireless links 122 and 123, respectively, to the reader 111, while a third tag 103 is located further away and may as such not communicate with the reader 111 at present. However, the third tag 103 is within a range 132 of a second reader 112 and may as such communicate with the second reader 112 over a wireless link 124. Each tag contains an Electronic Product Code (EPC) (not shown) that can be detected by the reader with which the tag can communicate. As is explained in further detail below, there is a method comprising polynomials and identities for each tag and each reader, allowing a reader to read the EPC of a tag with considerable security, ensuring the authenticity of the EPC. A Trusted Third Party (TTP) 121 distributes polynomials and identities (not shown) to the tags and the readers.

Below follows a detailed discussion of a method according to an embodiment of the present invention.

The proposed solution for private authentication is based on Blom's scheme with the generation of shared secrets by means of polynomials. The advantage of this scheme is that each prover and each verifier can share a unique secret without the need to (i) establish a mutual secret between them before the start of the protocol, and (ii) store all these secrets at each party. With a shared secret between a tag and a reader, values can be securely exchanged between these parties. Moreover, this scheme fulfils the requirement that there be no pre-registration of tags with readers.

The entities in the system comprise low-power RFID tags 101, 102, 103, RFID readers 111, 112 and a trusted third party (TTP) 121. These entities' actions as well as the interactions between them are described below.

The TTP 121 chooses a polynomial $Q(x, y_1, y_2)$ in three variables, referred to as the "master" polynomial. The polynomial's degree in the variable x is (n−1), whereas in the variables $y_1$ and $y_2$, it is (m−1), so the overall polynomial has degree of freedom equal to n×m×m. The values n and m are chosen such that m is relatively small and n is relatively large, for reasons that will become clear below. Moreover, $Q(x, y_1, y_2)$ is chosen such that it is symmetric in the variables $y_1$ and $y_2$, i.e., $Q(x, y_1, y_2)=Q(x, y_2, y_1)$, for all $(x, y_1, y_2)$. Under these constraints, the polynomial is chosen randomly.

The TTP 121 then distributes to each reader R 111, 112 in the system:

(i) a random number $ID_R$, that is the reader's identifier in the polynomial system, and (ii) four polynomials of the form $Q_R^{(p)}(x, y_1)=Q(x, y_1, y_2=ID_R+p)$ with p=0, 1, 2, 3, in two variables x and $y_1$, and with n×m coefficients which are to be kept secret by the reader 111, 112.

For any two readers Ri and Rj in the system, it must hold that $ID_R^{(i)} \neq ID_R^{(j)}+p$, for all i, j and p.

Moreover, the TTP 121 distributes to each tag T 101, when they enter the system:

a) the random numbers $ID_T$ (the tag's identifier in the polynomial system) and S, a random number (which mimics a "parent" reader's ID, see below), and b) the polynomial $Q_T(y_1)=Q(x=ID_T, y_1, y_2=S)$ in one variable $y_1$, with m coefficients which are to be kept secret by the tag 101.

Alternatively, when distributing values to tag T 101, the TTP 121 may also be in the form of a trusted reader TR (trusted by the tag 101) which sends to tag T 101:

(i) the random numbers $ID_T$ (as above) and $ID_{TR}$ (the trusted reader's identifier in the polynomial system), and (ii) the polynomial $Q_T(y_1)=Q(x=ID_T, y_1, y_2=ID_{TR})$, as above.

The trusted reader TR is referred to as the tag's "parent".

Because m is relatively small and n is relatively large, the tag does not need to store a very large polynomial (m coefficients). The reader 111, 112, on the other hand, has to store n×m coefficients. The storage burden is here shifted towards the (much more resourceful) reader 111, 112.

The transmission of the random numbers (e.g., identifiers) and the polynomial's coefficients should be done over a secure channel in this initial setup of the system. Moreover, any new entity (tag or reader) may enter the system at any point in time. Upon entering the system at any point in time, the same procedure as described above in the initial setup (for readers and for tags) is carried out.

Figure 2:
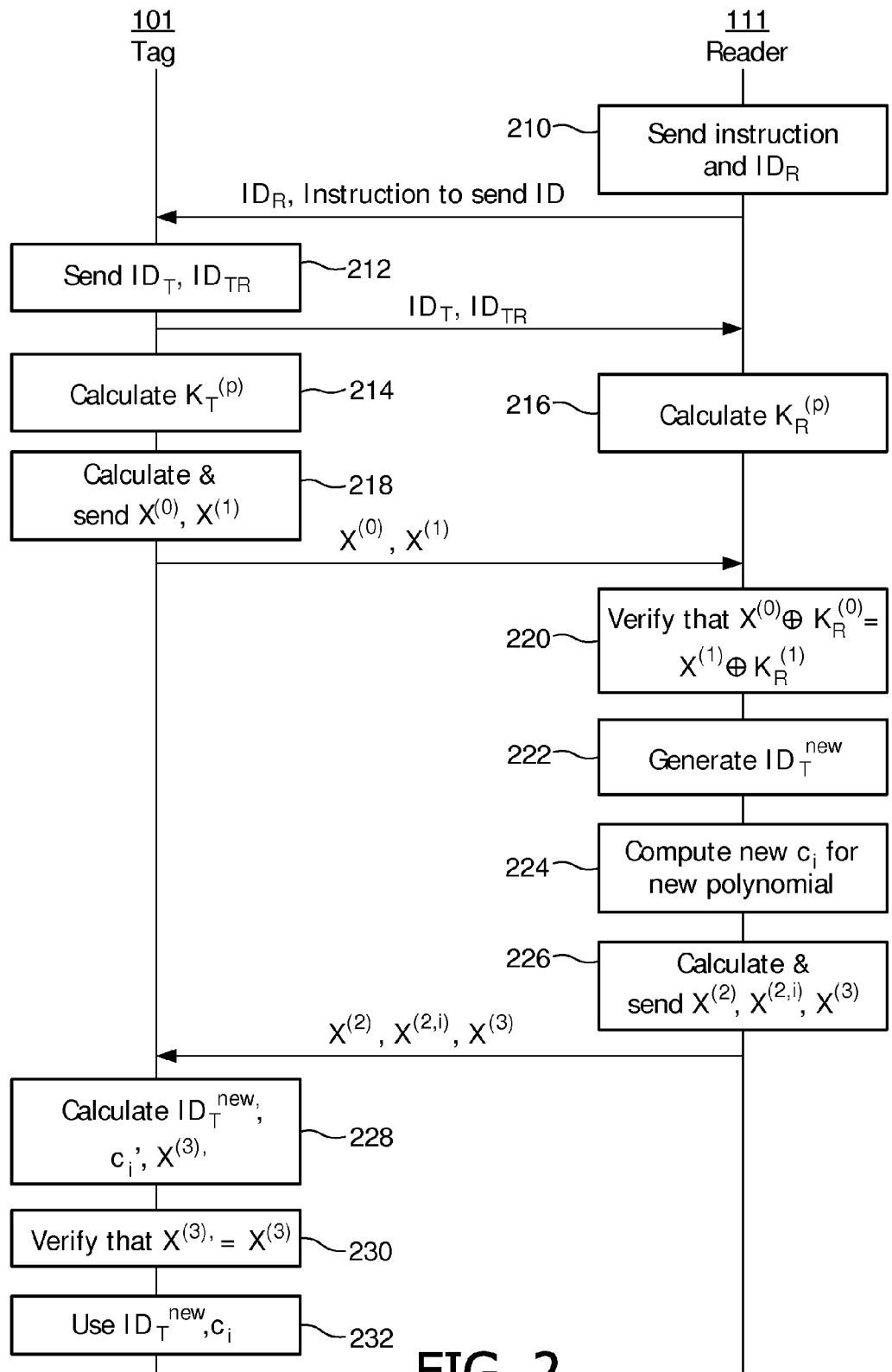
FIG. 2 shows a sequence diagram illustrating a protocol of a first embodiment of the present invention.

In order for a tag T 101 to privately send its unique (EPC) identifier to reader R 111, the protocol depicted in FIG. 2 takes place. In this protocol, the establishment of shared secrets between the tag 101 and the reader 111 is accomplished by the tag 101 and the reader 111 initially revealing their polynomial identifiers to one another. As it will be described, with these shared secrets, the two parties can mutually authenticate and the tag 101 can secretly send its unique EPC identifier. However, in this process an observer can learn that tag's polynomial identifier $ID_T$. In order to prevent that a tag 101 be tracked via $ID_T$ and the linkability of different authentication sessions, the reader 111 that is querying the tag 101 in a given authentication session "refreshes" the tag 101 at the end of the session. This means that the reader 111 generates a new identifier and new polynomial coefficients and sends them securely to the tag 101, which then updates these values. This reader 111 then becomes the tag's new parent. The whole protocol is explained in detail below. The alternative set-up above (involving the trusted reader TR) is used and, for simplicity, it is assumed that the tag 101 is authenticated for the first time after entering the system (i.e., its parent is the trusted reader TR). This assumption does not compromise the generality of the solution.

FIG. 2 shows a sequence diagram illustrating a protocol of a first embodiment of the present invention, involving the tag 101 and the reader 111.

In a first step 210 the reader 111 initiates communication by sending a request to the tag 101 to send its tag identifier, $ID_T$ and its parent identifier $ID_{TR}$. Additionally, the reader 111 sends its identifier $ID_R$ to the tag 101.

In step 212, after being queried by the reader 111 in step 210, the tag 101 sends its identifier $ID_T$ and the identifier $ID_{TR}$ of its present parent to the reader 111.

The tag 101 then calculates, in step 214, the values $K_T^{(p)} = Q_T(ID_R+p) = Q(x=ID_T, y_1=ID_R+p, y_2=ID_{TR})$ for p=0, 1, 2, 3. Correspondingly, the reader 111 calculates, in step 216, the values $K_R^{(p)} = Q_R^{(p)}(ID_T, ID_{TR}) = Q(x=ID_T, y_1=ID_{TR}, y_2=ID_R+p)$, for p=0, 1, 2, 3. Given polynomial symmetry, it holds that $K_T^{(p)} = K_R^{(p)}$, provided that the tag's and the reader's polynomials were generated in the way prescribed before. When this is the case, the tag 101 and the reader 111 can establish the shared secrets $K_T^{(p)} = K_R^{(p)} \equiv K^{(p)}$, for p=0, 1, 2, 3.

In step 218, after generation of secrets on both sides, the tag 101 XORs its EPC identifier with its calculated $K_T^{(0)}$ and also with its calculated $K_T^{(1)}$, and sends the two resulting values $X^{(0)}$ and $X^{(1)}$ to the reader 111. This is done by the tag 101 with two different secret values (or keys) $K_T^{(0)}$ and $K_T^{(1)}$. Consequently, the reader 111 can in step 220 (i) recover the tag's EPC identifier from $X^{(0)}$ by XORing it with its calculated secret $K_R^{(0)}$, and (ii) check the EPC identifier from $X^{(1)}$ by XORing it with its calculated secret $K_R^{(1)}$. If the two values do not match, the reader 111 stops. If they match, the tag 101 is authenticated by the reader 111 (since it could generate the same keys as the reader 111) and the correct EPC identifier is obtained by the reader 111.

The reader 111 then proceeds to update the tag 101. In step 222, it chooses a random number $ID_T^{new}$ (which will serve as the tag's new polynomial identifier) and calculates in step 224 the new polynomial $Q_R(X=ID_T^{new}, y_1) = Q(x=ID_T^{new}, y_1, y_2=ID_R)$ with coefficients $c_i$ (i=0, 1, ..., m−1). Then in step 226, the reader 111 XORs $ID_T^{new}$ and each of the new coefficients $c_i$ with its calculated $K_R^{(2)}$ to form the values $X^{(2)}$ and $X^{(2,i)}$. In order to allow the tag 101 to check these values (as done before for the reader 111), the reader 111 further XORs the new identifier $ID_T^{new}$ and the checksum value $C = c_0 \oplus c_1 \oplus c_2 \ldots c_m-1$ with its calculated $K_R^{(3)}$ to form the value $X^{(3)}$. It is to be noted that '$\oplus$' here denotes a XOR operation. All these (m+2) values are then sent to the tag 101.

The tag 101 can now in step 228 recover $ID_T^{new'}$ and the new coefficients $c_i'$ from $X^{(2)}$ and $X^{(2,i)}$ by XORing each of them with its calculated secret $K_T^{(2)}$. Moreover, the tag 101 can in step 230 check these values by calculating the checksum value $C' = c_0' \oplus c_1' \oplus c_2' \ldots c_{m-1}'$. The tag 101 then uses this and its calculated secret $K_T^{(3)}$ to calculate $X^{(3)'} = ID_T^{new'} \oplus C' \oplus K_T^{(3)}$. If $X^{(3)'} \neq X^{(3)}$, the tag 101 stops. If the values match, the reader 111 is authenticated by the tag 101 (since it could generate the same keys as the tag 101) and the correct new identifier $ID_T^{new}$ as well as the correct new coefficients are obtained by the tag 101.

In step 232, the tag 101 finally overwrites its polynomial and identifier with the new values, which are used for the next time this method is started.

In one embodiment, there may be more secrets shared between the tag 101 and the reader 111 for further operations if needed, i.e., p may assume a value larger than 3. More explicitly, p=0, 1, 2, ..., P, where P>3. This is discussed in further detail below.

In the scheme described above, the TTP 121 has a (master) polynomial in three variables, which is reduced to polynomials in two variables which are given to readers, which in their turn are reduced to polynomials in one variable given to tags. The hierarchy can be extended upwards, i.e., more TTPs may be introduced above the original TTP 121 with polynomials in four, five, etc variables, which are reduced in degree each level down the hierarchy. This allows the organization of the system in various levels, with each TTP being responsible for the entities (i.e., other TTPs, readers and tags) which come under it.

It is optionally possible to let readers store their communication history. This history may be used to backtrack any anomalies.

As the global system security relies on the secrecy of the master polynomial, this is now discussed in more detail with additional embodiments being described.

The master polynomial $Q(x, y_1, y_2)$ has n×m×m coefficients, but since it is symmetric in the last two variables, it has nm(m+1)/2 degrees of freedom (the same degree of freedom that one has for n symmetric matrices of size m×m).

For $K=Q(V_1, V_2, V_3)$, learning the secret K together with the values $V_1$, $V_2$ and $V_3$ gives one equation on the coefficients of the polynomial $Q(x, y_1, y_2)$. Learning one polynomial $Q_T(y_1)$ stored in a tag gives the equivalent of m equations on the coefficients of Q. Learning one polynomial $Q_R^{(p)}(x, y_1)$ stored in a reader gives m×n equations on the coefficients of Q. This means that:

It is hence necessary to "break" (meaning, illicitly learn the secrets of) n(m+1)/2 tags in order to learn the master polynomial.

In case a reader has (P+1) polynomials (it is to be noted that P=3 in FIG. 2), it is hence necessary to break (m+1)/(2(P+1)) readers in order to obtain the master polynomial.

As mentioned previously, the values n and m are chosen such that m is relatively small and n is relatively large. This means that, given the assumption that readers are much harder to break than tags, a much larger number of tags than number of readers (number of tags/number of readers=n(P+1)) needs to be broken for an attacker to obtain the master polynomial.

An attacker that listens to the communication between a legitimate tag T and a legitimate reader R may record the communication and later replay it to either simulate the reader to the tag or simulate the tag to the reader. These two cases are considered below.

When a malicious reader tries to read a legitimate tag, the simple replay of the values cannot help the reader since the tag's polynomial identifier is not the same as the value sent in the recorded protocol (because values are updated at the end of the protocol). The reader is not able to obtain the tag's EPC, since it cannot calculate the right secrets $K_R^{(0)}$ and $K_R^{(1)}$. Moreover, if the reader tries to update the tag with bogus values, the tag will detect the mismatch in the values of $ID_T^{new}$ and it will stop the protocol.

Figure 3:
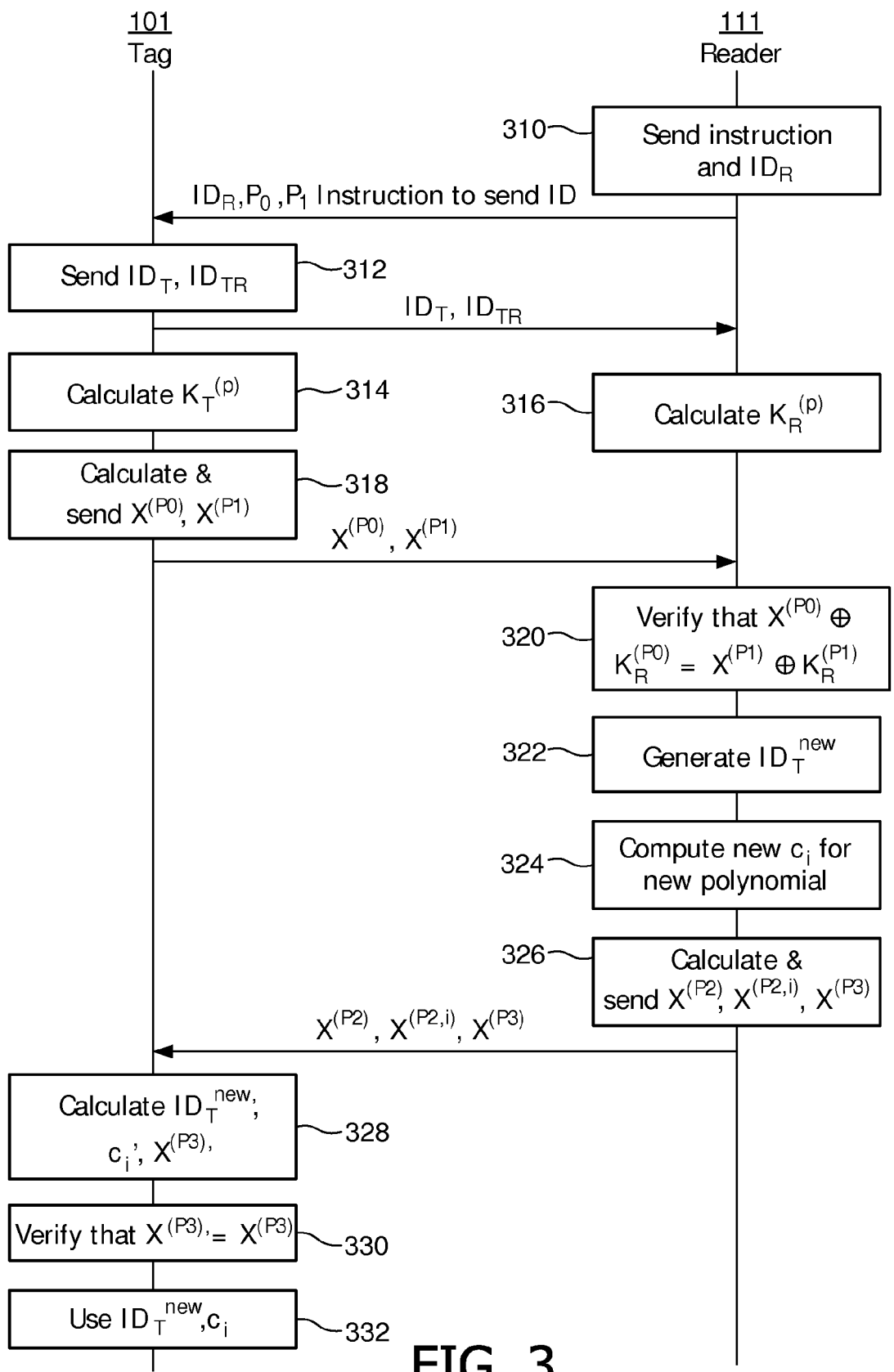
FIG. 3 shows a sequence diagram illustrating a protocol of a second embodiment of the present invention.

When a malicious tag tries to fool a legitimate reader by impersonating a valid tag, the tag must replay the full protocol but only with the legitimate reader R. In this case, the reader will obtain the EPC of tag T, and proceed to update the tag's values. Therefore the tag can fool the reader with a legitimate EPC. In order to prevent this attack, the system can be extended in the way described below which is depicted in FIG. 3. The protocol according to this embodiment will now be described in more detail.

During system set-up, the TTP 121 distributes to each reader 111 (R) 111 in the system a number (P+1) of polynomials, where P>3. As before, these polynomials are of the form $Q_R^{(p)}(x, y_1) = Q(x, y_1, y_2=ID_R+p)$ but now with p=0, 1, 2, 3, ..., P. The tags receive only one polynomial, as before. Now, at the start of the tag authentication protocol, in step 310, when the reader 111 sends its identifier $ID_R$ to the tag 101, the reader 111 also sends two distinct values, say $p_0$ and $p_1$, randomly chosen from the set $\{0, 1, 2, 3, \ldots, P\}$. Similar to the protocol described in conjunction with FIG. 2, the tag 101 sends $ID_T$ and $ID_{TR}$ to the reader 111. In step 314, the values $p_0$ and $p_1$ instruct the tag 101 to calculate the secrets $K_T^{(p)}{}_0 = Q_T(ID_R+p_0)$ and $K_T^{(p)}{}_1 = Q_T(ID_R+p_1)$ and use these secrets to, in step 318, XOR its EPC, producing $X^{(p)}{}_0$ and $X^{(p)}_1$, and send these values to the reader 111. In the meantime, the reader 111 has calculated corresponding shared secrets in step 316.

In this way, the values $X^{(p)}_0$ and $X^{(p)}_1$ have only a chance of 1 in $P(P+1)/2$ of being the same as the values that were recorded by the attacker, say, $X^{(0)}$ and $X^{(1)}$ (assuming that in the recorded protocol, $p_0=0$ and $p_1=1$, as in FIG. 2). And if the malicious tag cannot produce $X^{(p)}_0$ and $X^{(p)}_1$, the reader 111 is then able to detect it when checking the EPC value in step 320, and it stops the protocol.

The other two secrets used to send/check $ID_T^{new}$ and the new coefficients $c_i$, (i.e., $K_R^{(p)}{}_2/K_T^{(p)}{}_2$ and $K_R^{(p)}{}_3/K_T^{(p)}{}_3$) are generated by the reader and tag with p values, $p_2$ and $p_3$, which are agreed upon by readers and tags beforehand. For instance, they could always be chosen by the reader and the tag as the lowest two values in the remaining set $S=\{0, 1, 2, 3, \ldots, P\}-\{p_0, p_1\}$. It is to be noted that the crucial values are $p_0$ and $p_1$, the choice of which allows the reader to determine whether the tag is legitimate or not (with a chance of 1 in $P(P+1)/2$ of failure, as mentioned above).

Similar to the protocol described in conjunction with FIG. 2, the reader 111 generates an $ID_T^{new}$ in step 322 and computes new values of $c_i$ for a new tag polynomial in step 324. In step 326, values $X^{(P2)}$, $X^{(P2,i)}$ are calculated by XORing $ID_T^{new}$, and each coefficient $c_i$ with $K_R^{(P2)}$; $X^{(P3)}$ is calculated by the reader 111 further XORing the new identifier $ID_T^{new}$ and the checksum value $C=c_0 \oplus c_1 \oplus c_2 \ldots c_m-1$ with its calculated $K_R^{(P3)}$ to form the value $X^{(P3)}$. $X^{(P2)}$, $X^{(P2,i)}$ and $X^{(P3)}$ are then sent to the tag 101.

The tag 101 can now in step 328 recover $ID_T^{new'}$ and the new coefficients $c_i'$ from $X^{(P2)}$ and $X^{(P2,i)}$ by XORing each of them with its calculated secret $K_T^{(P2)}$. Moreover, the tag 101 can in step 330 check these values by calculating the checksum value $C'=c_0'\oplus c_1'\oplus c_2'\ldots c_{m-1}'$. The tag 101 then uses this and its calculated secret $K_T^{(P3)}$ to calculate $X^{(P3)'}= ID_T^{new'}\oplus C'\oplus K_T^{(P3)}$. If $X^{(P3)'}\neq X^{(P3)}$, the tag 101 stops. If the values match, the reader 111 is authenticated by the tag 101 (since it could generate the same keys as the tag 101) and the correct new identifier $ID_T^{new}$ as well as the correct new coefficients are obtained by the tag 101.

In step 332, the tag 101 finally overwrites its polynomial and identifier with the new values, which are used for the next time this method is started.

In the above, the value of P must be tuned as a trade-off between two security requirements: it should be large enough to reduce the possibility of impersonating attacks as described above, but should be considerably smaller than $(m-1)/2$ so that the number of readers $(m+1)/(2(P+1))$ that must be broken for an attacker to obtain the master polynomial is considerably large.

The cost of the proposed scheme is the increased communication between a tag and a reader, given that privacy is achieved by (i) concealing the EPC identifier of the tags, and (ii) the renewal of the tags' identifiers (in the polynomial scheme) and the tags' polynomials after successful mutual authentication. However, since the tags' polynomial has m coefficients and m is chosen so that it is relatively small, the communication burden is lessened (as well as the necessary storage space in the tags).

Although the described embodiments above are related to RFID, it is to be noted that the invention is not limited to RFID systems.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling authentication of a prover in a system comprising said prover and a verifier, said method comprising:
    said prover sending a prover identifier and a parent identifier to said verifier,
    said verifier sending a verifier identifier to said prover,
    said prover calculating a first common secret based at least in part on said verifier identifier received from the verifier, said prover identifier, and said parent identifier,
    said verifier calculating said first common secret based at least in part on said prover identifier received from the prover, said parent identifier received from the prover, and the verifier identifier,
    said prover creating a first message by modulating a first core secret with at least said first common secret,
    said prover sending said first message to said verifier, and
    said verifier creating a first candidate for said first core secret by demodulating said first message with said first common secret,
    wherein said candidate for said first core secret is for use in said authentication.

2. The method according to claim 1, wherein
    said calculating said first common secret by said prover, involves calculating said first common secret based also on a first value of a parameter, wherein said parameter is comprised of at least a first value and a second value,
    said calculating said first common secret by said verifier, involves calculating said first common secret based also on said first value of said parameter,
    and said method comprising:
    said prover calculating a second common secret based at least in part on said verifier identifier received from the verifier, said prover identifier, said parent identifier, and said second value of said parameter, and
    said verifier calculating a second common secret based at least in part on said prover identifier received from the prover, said parent identifier received from the prover, and the verifier identifier, and said second value of said parameter.

3. The method according to claim 2, wherein said prover calculating said second common secret includes calculating a sum of said verifier identifier received from the verifier and said first value of said parameter.

4. The method according to claim 2, comprising:
    said prover creating a second message by modulating said first core secret with said second common secret,
    said prover sending said second message to said verifier,
    said verifier creating a second candidate for said first core secret by demodulating said second message with said second common secret,
    said verifier conditionally authenticating said first core secret being said first candidate of said first core secret, said verifier condition comprising at least that a value of said first candidate for said first core secret equals a value of said second candidate for said first core secret.

5. The method according to claim 4, comprising:
    said verifier creating a second core secret,
    said verifier creating a third message by modulating said second core secret with a common secret,
    said verifier creating a calculating secret,
    said verifier creating a fourth message by modulating said calculating secret with a common secret,
    said verifier creating a fifth message by modulating said second core secret and said calculating secret with a common secret, said verifier sending said third, said fourth and said fifth messages to said prover, said prover creating a candidate second core secret by demodulating said third modulated message with a common secret corresponding to said common secret with which said third message was modulated, said prover creating a candidate calculating secret by demodulating said fourth modulated message with a common secret corresponding to said common secret with which said fourth message was modulated, said prover creating an authentication item by demodulating said fifth modulated message with a common secret corresponding to said common secret with which said fifth message was modulated, said prover conditionally authenticating said second core secret as said candidate second core secret and said calculating secret as said candidate calculating secret, said conditional prover condition comprising at least that said authentication item equals said fifth modulated secret.

6. The method according to claim 5, wherein said calculating secret comprises new coefficients for said prover polynomial, to be used by said prover when calculating subsequent common secrets.

7. The method according to claim 6, wherein said verifier creating a calculating secret involves creating coefficients for said prover polynomial by substituting an unknown in said first verifier polynomial with said second core secret.

8. The method according to claim 5, wherein said second core secret is set to be said prover identifier for a subsequent execution of said method.

9. The method according to claim 2, comprising, prior to of said prover sending a prover identifier:

said verifier choosing a first parameter and a second parameter, said verifier sending said first parameter and said second parameter to said prover, wherein of said prover calculating said first common secret involves using said first parameter, said prover calculating a second common secret involves using said second parameter, said first verifier polynomial is associated with said first parameter, and said second verifier polynomial is associated with said second parameter.

10. The method according to claim 5, comprising, before said verifier creating a fourth message, of:

said prover and said verifier establishing a third common secret and a fourth common secret, and wherein in said verifier creating a third message, said common secret is said third common secret, in said verifier creating a fourth message, said common secret is said third common secret, in said verifier creating a fifth message, said common secret is said fourth common secret, in said prover creating a candidate second core secret, said common secret is said third common secret, in said prover creating a candidate calculating secret, said common secret is said third common secret, in said prover creating an authentication item, said common secret is said fourth common secret.

11. The method according to claim 10, wherein said third common secret is based in part on a third value of said parameter and said fourth secret is based in part on a fourth value of said parameter.

12. The method according to claim 5, wherein said verifier creating said second core secret, involves setting said second core secret to a random number.

13. The method according to claim 1, wherein said system is a Radio Frequency Identification system.

14. The method according to claim 1, wherein said first core secret is an Electronic Product Code.

15. The method according to claim 1, wherein each operation of modulating involves performing an exclusive OR operation of a first core secret with said first common secret, and each operation of demodulating involves performing an exclusive OR operation of said first message with said first common secret.

16. A system for enabling authentication of a prover, said system comprising said prover and a verifier, said prover, said prover comprising means for sending a prover identifier and a parent identifier to said verifier, said verifier comprising means for sending a verifier identifier to said prover, said prover comprising means for calculating a first common secret based at least in part on said verifier identifier received from the verifier, said prover identifier, and said parent identifier, said verifier comprising means for calculating said first common secret based at least in part on said prover identifier received from the prover, said parent identifier received from the prover, and the verifier identifier, said prover comprising means for creating a first message by modulating a first core secret with at least said first common secret, said prover comprising means for sending said first message to said verifier, and said verifier comprising means for creating a first candidate for said first core secret by demodulating said first message with said first common secret, wherein said candidate for said first core secret is for use in said authentication.

17. A system according to claim 16, wherein said system is a Radio Frequency Identification system.

* * * * *